United States Patent
Ohara et al.

(10) Patent No.: US 7,634,552 B2
(45) Date of Patent: Dec. 15, 2009

(54) COMMUNICATION SYSTEM, INFORMATION-PROCESSING DEVICE, AND PROGRAM

(75) Inventors: Kiyotaka Ohara, Aichi (JP); Makoto Matsuda, North Brunswick, NJ (US); Kazuma Aoki, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 458 days.

(21) Appl. No.: 11/427,087

(22) Filed: Jun. 28, 2006

(65) Prior Publication Data

US 2007/0005748 A1   Jan. 4, 2007

(30) Foreign Application Priority Data

Jun. 29, 2005   (JP) ............................. 2005-190131

(51) Int. Cl.
G06F 15/177 (2006.01)
(52) U.S. Cl. .................... 709/220; 709/217; 709/218; 709/219
(58) Field of Classification Search .................. 709/217, 709/218, 219
See application file for complete search history.

(56) References Cited

U.S. PATENT DOCUMENTS

| | | | |
|---|---|---|---|
| 5,764,906 A * | 6/1998 | Edelstein et al. ............. | 709/219 |
| 2003/0097404 A1 * | 5/2003 | Sakakibara et al. ......... | 709/203 |
| 2003/0140136 A1 * | 7/2003 | Nakamura ................... | 709/224 |
| 2003/0204613 A1 | 10/2003 | Hudson et al. | |
| 2004/0034624 A1 | 2/2004 | Deh-Lee et al. | |
| 2004/0034716 A1 | 2/2004 | Sundarraj et al. | |
| 2004/0034786 A1 * | 2/2004 | Okamoto et al. ............. | 713/189 |
| 2004/0148344 A1 * | 7/2004 | Navar et al. ................. | 709/203 |
| 2004/0162076 A1 | 8/2004 | Chowdry et al. | |
| 2004/0184475 A1 * | 9/2004 | Meier .......................... | 370/449 |
| 2005/0119913 A1 * | 6/2005 | Hornreich et al. ............... | 705/2 |
| 2006/0170965 A1 * | 8/2006 | Ohara ......................... | 358/1.15 |
| 2006/0217126 A1 * | 9/2006 | Sohm et al. .................. | 455/454 |

(Continued)

FOREIGN PATENT DOCUMENTS

EP   1311099 A2 *   5/2003

(Continued)

OTHER PUBLICATIONS

European Patent Office, European Search Report for Counterpart EP Application No. 06253384 dated Sep. 29, 2006.

*Primary Examiner*—Firmin Backer
*Assistant Examiner*—Jonathan Bui
(74) *Attorney, Agent, or Firm*—Baker Botts L.L.P.

(57) ABSTRACT

A communication system is configured to include at least one information-processing device, at least one information-providing server and a management server. The management server manages whether contents to be transmitted to the information-processing device, which has been registered with the information-providing server, are available in the information-providing server. The information-processing device requests the management server to check availability of specified contents at intervals of a transmission period predetermined for each of the specified contents and receives a check result therefrom. If a plurality of transmission services is to be started, the information-processing device requests the management server to check availability of the contents corresponding to the plurality of transmission services at intervals of a single transmission period which is determined based on the transmission periods predetermined for the contents corresponding to respective ones of the plurality of transmission services.

9 Claims, 10 Drawing Sheets

U.S. PATENT DOCUMENTS

2006/0235885 A1* 10/2006 Steele et al. ............. 707/104.1
2006/0265467 A1* 11/2006 Jang ........................... 709/216
2008/0243698 A1* 10/2008 Tanaka ........................ 705/57

FOREIGN PATENT DOCUMENTS

| | | | |
|---|---|---|---|
| EP | 1533981 A2 | 5/2005 | |
| JP | 2000115736 A | 4/2000 | |
| JP | 2000201156 A | 7/2000 | |
| JP | 2003244182 A | 8/2003 | |

* cited by examiner

FIG.5A

POLLING PERIOD LIST REQUEST

COMMAND: POLLING PERIOD LIST REQUEST
DEVICE ID:BRV_598726

FIG.5B

POLLING PERIOD LIST

POLLING PERIOD:10 MINUTES
POLLING PERIOD:30 MINUTES

FIG.5C

EXISTENCE CHECKING REQUEST

COMMAND: EXISTENCE CHECKING REQUEST
DEVICE ID:BRV_598726

FIG.5D

CHECK RESULT

CONTENTS: NOT EXIST

FIG.5E

CHECK RESULT

CONTENTS: EXIST
SERVICE URL=http://xxx.yyy.zzzz

FIG.8A

REGISTRATION REQUEST

COMMAND: START OF TRANSMISSION SERVICE
DEVICE ID:BRV_598726
POLLING PERIOD: 10 MINUTES

FIG.8B

REGISTRATION REQUEST

COMMAND: STOP OF TRANSMISSION SERVICE
DEVICE ID:BRV_598726

FIG.8C

CONTENTS REGISTRATION REQUEST

COMMAND: CONTENTS REGISTRATION REQUEST
DEVICE ID: BRV_598726
SERVICE URL=http://xxx.yyy.zzzz

COMMUNICATION SYSTEM, INFORMATION-PROCESSING DEVICE, AND PROGRAM

CROSS-REFERENCE TO RELATED APPLICATION

This application claims priority under 35 U.S.C. §119 from Japanese Patent Application No. 2005-190131, filed on Jun. 29, 2005. The entire subject matter of the application is incorporated herein by reference.

BACKGROUND

1. Technical Field

Aspects of the invention relate to a communication system configured with an information-processing device that receives contents, an information-providing server that sends the contents, and a management server that checks whether the contents to be received by the information-processing device exist in the information-providing server being interconnected via a network, and one or more techniques in relation to the communication system.

2. Related Art

Recently, a transmission service in which contents such as news are periodically sent via an internet has widely been used. Such a transmission service is provided with an information-processing device at a side of a user of the transmission service being connected with a server that sends the contents via the internet. The information-processing device sends a transmission request for requesting to send the contents to the server at intervals of a predetermined period in the transmission service, and receives the contents sent from the server in response to the transmission request. Namely, a technique called "polling" is employed.

SUMMARY

Aspects of the invention are advantageous in that there can be provided an improved communication system that can prevent too much heavy traffic on a network from being caused even when using two or more transmission services in which two or more contents are sent, and one or more techniques related to the communication system.

BRIEF DESCRIPTION OF THE ACCOMPANYING DRAWINGS

FIGS. 5A, 5B, 5C, 5D, and 5E are illustrations schematically showing data that are sent and received in various kinds of processes to be executed by the control portion of the MFP in the first illustrative aspect according to the present invention.

Figure 6:
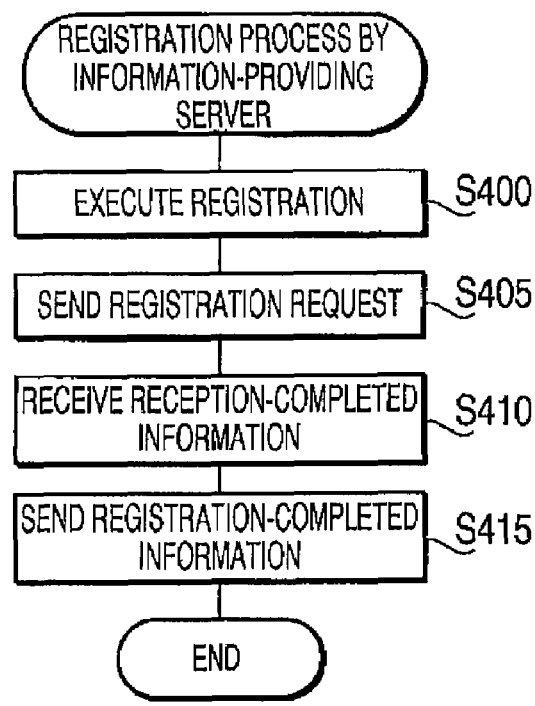

FIG. 6 is a flowchart showing a procedure of a registration process to be executed by a control portion of an information-providing server in the first illustrative aspect according to the present invention.

Figure 7:
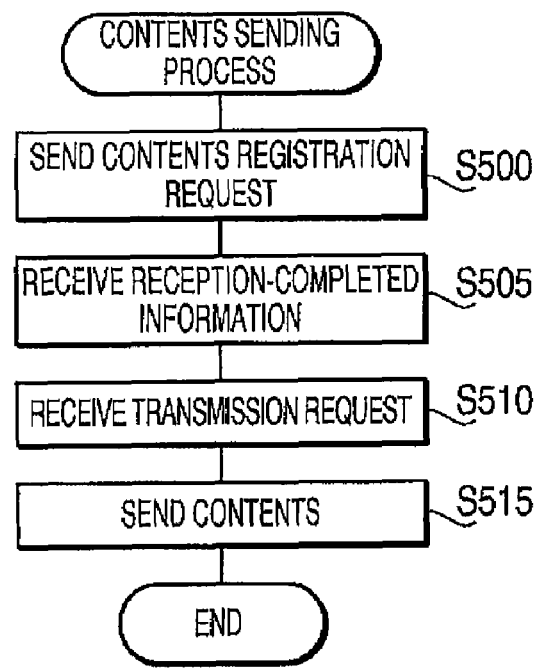

FIG. 7 is a flowchart showing a procedure of a contents sending process to be executed by the control portion of the information-providing server in the first illustrative aspect according to the present invention.

FIGS. 8A, 8B, and 8C are illustrations schematically showing data that are sent and received in various kinds of processes to be executed by the control portion of the information-providing server in the first illustrative aspect according to the present invention.

Figure 9:
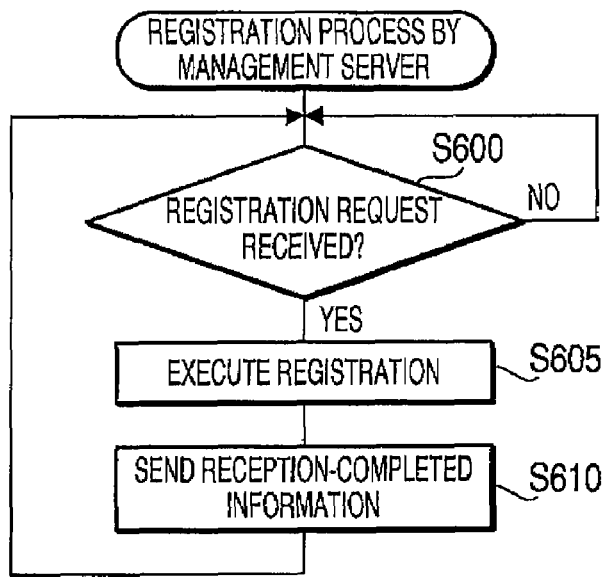

FIG. 9 is a flowchart showing a procedure of a registration process to be executed by a control portion of a management server in the first illustrative aspect according to the present invention.

Figure 10:
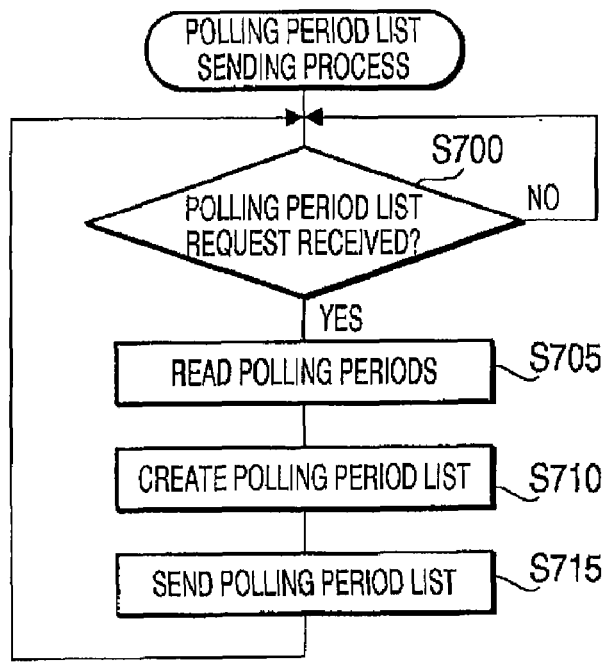

FIG. 10 is a flowchart showing a procedure of a polling period list sending process to be executed by the control portion of the management server in the first illustrative aspect according to the present invention.

Figure 11:
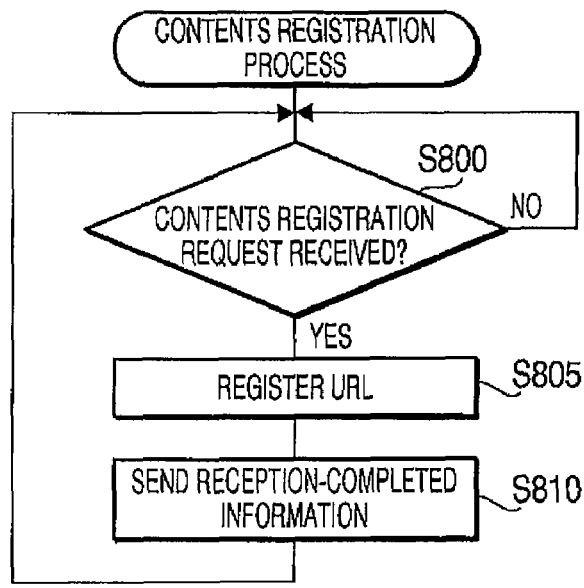

FIG. 11 is a flowchart showing a procedure of a contents registration process to be executed by the control portion of the management server in the first illustrative aspect according to the present invention.

Figure 12:
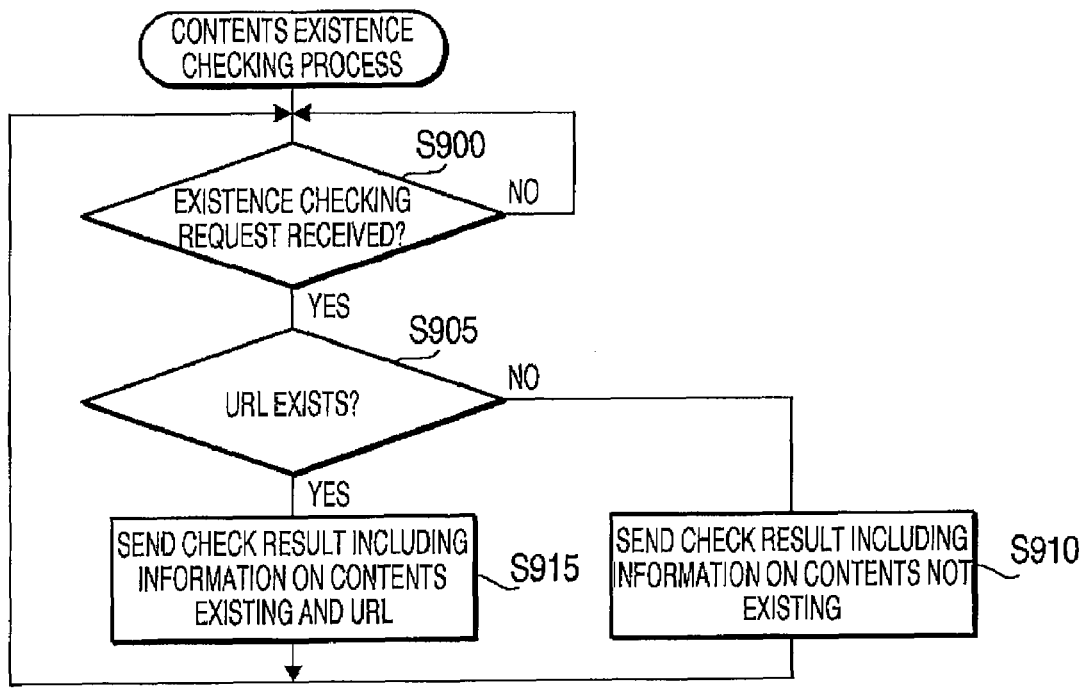

FIG. 12 is a flowchart showing a procedure of a contents existence checking process to be executed by the control portion of the management server in the first illustrative aspect according to the present invention.

Figure 13:
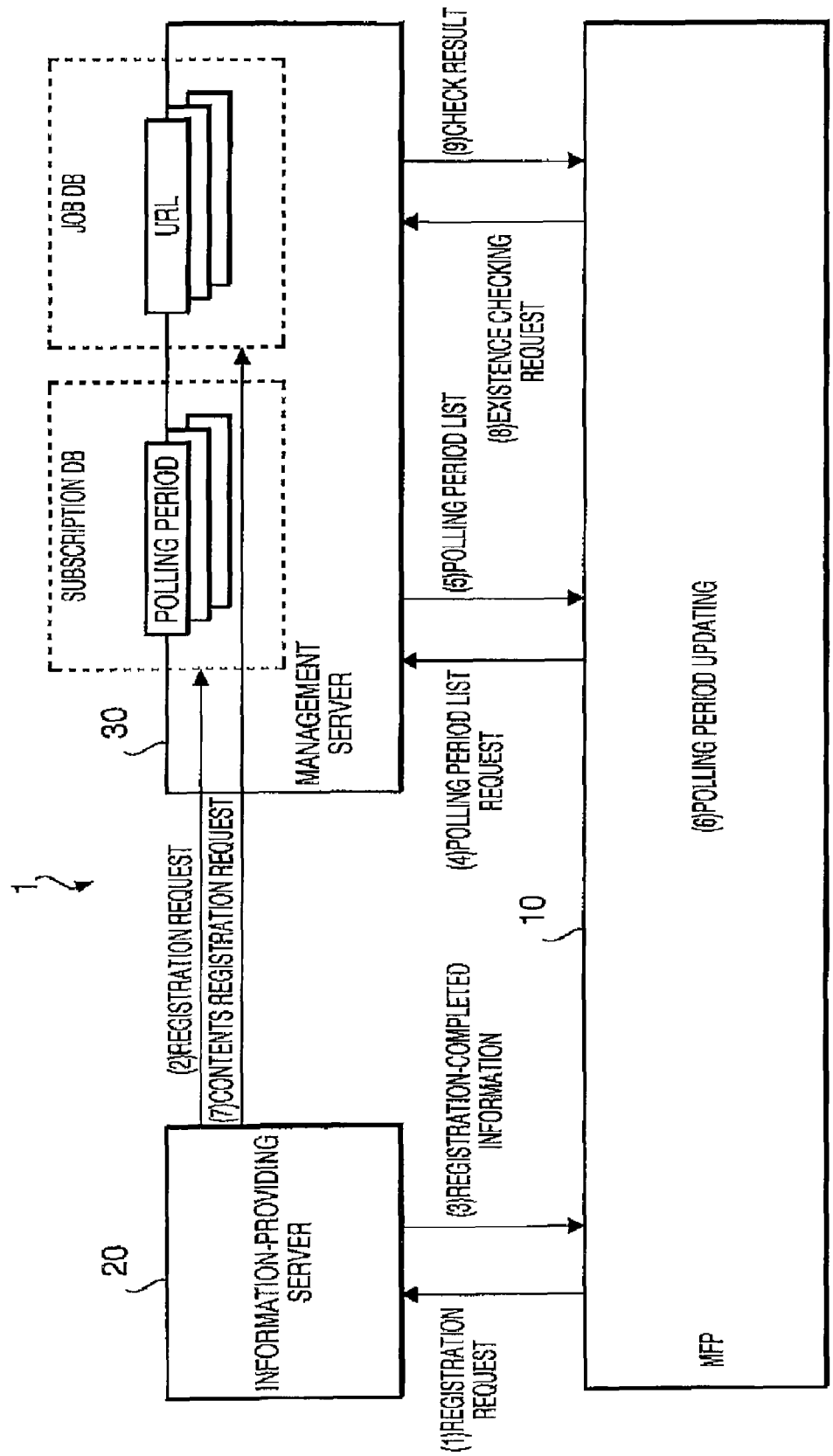

FIG. 13 is an illustration schematically showing a procedure of the process in the whole of the communication system in the first illustrative aspect according to the present invention.

Figure 14:
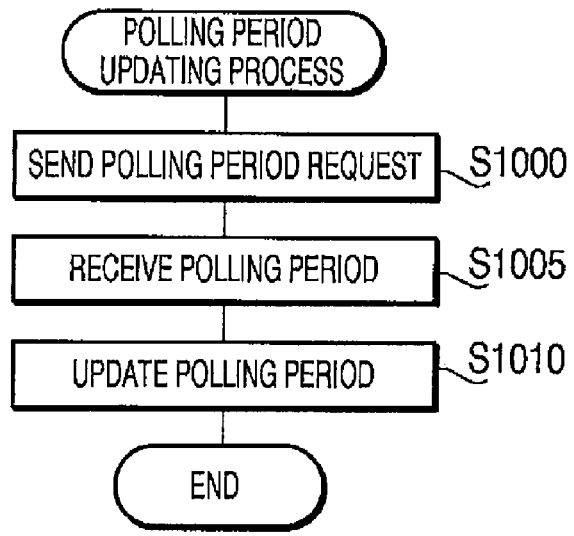

FIG. 14 is a flowchart showing a procedure of a polling period updating process to be executed by the control portion of the MFP in a second illustrative aspect according to the present invention.

Figure 15:
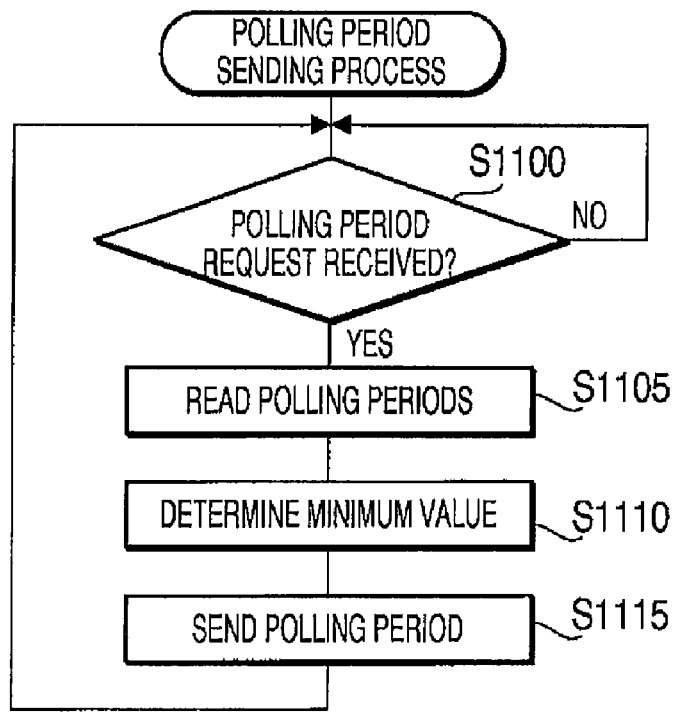

FIG. 15 is a flowchart showing a procedure of a polling period sending process to be executed by the control portion of the management server in the second illustrative aspect according to the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

General Overview

According to aspects of the present invention, there is provided a communication system, which comprises: at least one information-processing device configured to receive contents; at least one information-providing server configured to send the contents to the at least one information-processing device; and a management server configured to check whether the contents to be received by the at least one information-processing device exist in the at least one information-providing server. The communication system is configured with the at least one information-processing device, the at least one information-providing server, and the management server being interconnected via a network. The information-processing device comprises: a registration request sending system configured to send a registration request for requesting to register one of a start and a stop of a transmission service of sending specified contents to the information-providing server; a registration-completed information receiving system configured to receive registration-completed information for informing that the registration of one of the start and stop of the transmission service has been completed that is to be sent from the information-providing server in response to the registration request; an existence checking request sending system configured to send an existence checking request for checking whether the specified contents exist in the information-providing server in response to the registration-completed information receiving system receiving the registration-completed information to the management server at intervals of a transmission period predetermined for each of the specified contents; an existence judging system configured to receive a check result to be sent from the management server in response to the existence checking request and to judge whether the received check result represents that the specified contents exist in the information-providing server; a transmission requesting system configured to send a transmission request for requesting to send the specified contents to the information-providing server, in response to the existence judging system judging that the specified contents exist; a specified contents receiving system configured to receive the specified contents to be sent from the information-providing server in response to the transmission request; and a transmission period updating system configured to update each of the transmission periods with a representative period determined based upon the transmission period of each of the specified contents to be sent by two or more transmission services, in response to starting to employ the two or more transmission services with the registration-completed information receiving system receiving the registration-completed information. The information-providing server comprises: a transmission service registering system configured to receive the registration request to be sent from the information-processing device to register one of the start and stop of the transmission service in accordance with the received registration request; a registration-completed information sending system configured to send the registration-completed information to the information-processing device in response to the transmission service registering system completing one of the start and stop of the transmission service; an existence information sending system configured to send existence information representing that the specified contents for which the transmission service registering system has registered the start of the transmission service exist in the information-providing server, in response to the specified contents existing in the information-providing server; an transmission request receiving system configured to receive the transmission request to be sent from the information-processing device; and a specified contents sending system configured to send the specified contents to the information-processing device, in response to the transmission request receiving system receiving the transmission request. The management server comprises: an existence information receiving system configured to receive the existence information to be sent from the information-providing server; an existence checking request receiving system configured to receive the existence checking request from the information-processing device; and a check result sending system configured to judge whether the existence information receiving system has received the existence information and to send the judgment result to the information-processing device as the check result, in response to the existence checking request receiving system receiving the existence checking request.

According to the communication system thus configured, in the information-processing device, the registration request sending system sends the registration request for requesting to register the start or the stop of the transmission service of sending specified contents to the information-providing server. The registration-completed information receiving system receives the registration-completed information for informing that the registration of the start or the stop of the transmission service has been completed that is sent from the information-providing server in response to the registration request. The existence checking request sending system sends the existence checking request for checking whether the specified contents exist in the information-providing server in response to the registration-completed information receiving system receiving the registration-completed information to the management server at intervals of the transmission period predetermined for each of the specified contents. The existence judging system receives the check result sent from the management server in response to the existence checking request to judge whether the received check result represents that the specified contents exist in the information-providing server. Here, in response to the existence judging system judging that the specified contents exist, the transmission requesting system sends the transmission request for requesting to send the specified contents to the information-providing server, and a specified contents receiving system receives the specified contents sent from the information-providing server in response to the transmission request. In this respect, however, in response to starting to employ the two or more transmission services with the registration-completed information receiving system receiving the registration-completed information, the transmission period updating system updates each of the transmission periods with the representative period determined based upon the transmission period of each of the specified contents sent by two or more transmission services.

In addition, in the information-providing server, the transmission service registering system receives the registration request sent from the information-processing device to register the start or the stop of the transmission service in accordance with the received registration request. The registration-completed information sending system sends the registration-completed information to the information-processing device in response to the transmission service registering system completing the start or the stop of the transmission service. The existence information sending system sends the existence information representing that the specified contents for which the transmission service registering system has registered the start of the transmission service exist in the information-providing server, in response to the specified contents existing in the information-providing server. In the meantime, when the transmission request receiving system receives the transmission request sent from the information-processing device, and then, the specified contents sending system sends the specified contents to the information-processing device.

In addition, in the management server, the existence information receiving system receives the existence information sent from the information-providing server. Meanwhile, when the existence checking request receiving system receives the existence checking request from the information-processing device, the check result sending system judges whether the existence information receiving system has received the existence information to send the judgment result to the information-processing device as the check result.

Namely, in the communication system, the information-processing device sends the existence checking request for checking whether the specified contents for which the start of the transmission service is registered exist in the information-providing server to the management server at intervals of the transmission period for each of the specified contents. When the check result received from the management server represents that the specified contents exist in the information-providing server, the information-processing device sends the transmission request for requesting to send the specified contents to receive the specified contents from the information-providing server, When starting to employ the two or more transmission services, each of the transmission periods is updated with the representative period determined based upon the transmission period of each of the specified contents.

For this reason, in the communication system, when employing the two or more transmission services, the existence checking request is not required to be sent separately for each of the transmission services. Therefore, it is possible to employ the two or more transmission services without causing too much heavy traffic on the network. It is noted that the information-providing server and management server may be configured as the same device, and may be configured as separate devices.

Optionally, the information-processing device may comprise a transmission period information request sending system configured to send a transmission period information request for requesting to inform of the transmission period of the specified contents for which the start of the transmission service has been registered by the registration request, in response to the registration-completed information receiving system receiving the registration-completed information according to the registration request for requesting to register the start of the transmission service. In this case, the transmission period updating system may be configured to update each of the transmission periods with the representative period that is determined based upon the two or more transmission periods included in transmission period information to be sent from the management server in response to the transmission period information request. Further, the information-providing server may comprise a transmission period data sending system configured to send transmission period data representing the transmission period of the specified contents, in response to the transmission service registering system completing the registration of the start of the transmission service. Still optionally, the management server may comprise a transmission period data receiving system configured to receive the transmission period data to be sent from the information-providing server, and a transmission period data sending system configured to send the transmission period data to be received by the transmission period data receiving system to the information-processing device as the transmission period information, in response to the transmission period information request to be sent from the information-processing device.

In this case, in the information-processing device, the transmission period information request sending system sends the transmission period information request for requesting to inform of the transmission period of the specified contents for which the start of the transmission service has been registered by the registration request, in response to the registration-completed information receiving system receiving the registration-completed information according to the registration request for requesting to register the start of the transmission service. Then, the transmission period updating system updates each of the transmission periods with the representative period that is determined based upon the two or more transmission periods included in transmission period information sent from the management server in response to the transmission period information request.

Further, in the information-providing server, the transmission period data sending system sends the transmission period data representing the transmission period of the specified contents, in response to the transmission service registering system completing the registration of the start of the transmission service. Furthermore, in the management server, the transmission period data receiving system receives the transmission period data sent from the information-providing server, and a transmission period data sending system sends the transmission period data received by the transmission period data receiving system to the information-processing device as the transmission period information, in response to the transmission period information request sent from the information-processing device.

In other words, according to the communication system thus configured, the information-processing device can receive the transmission period data sent from the information-providing server via the management server, and update each of the transmission periods with the representative period determined based upon the transmission periods included in the transmission period data Optionally, the information-processing device may comprise a transmission period information requesting system configured to send a representative period information request for requesting to inform of the representative period, in response to the registration-completed information receiving system receiving the registration-completed information according to the registration request for requesting to register the start of the transmission service, In this case, the transmission period updating system may be configured to update each of the transmission periods with the representative period included in representative period information to be sent from the management server in response to the representative period information request. Still optionally, the information-providing server may comprise a transmission period data sending system configured to send transmission period data representing the transmission period of the specified contents, in response to the transmission service registering system completing the registration of the start of the transmission service. Further optionally, the management server may comprise a transmission period determining system configured to determine the representative period based upon the two or more transmission period data to be sent from the information-providing server, and a transmission period informing system configured to send the representative period information representing the representative period determined by the transmission period determining system, in response to the representative period information request to be sent from the information-processing device.

In this case, in the information-processing device, the transmission period information requesting system sends the representative period information request for requesting to inform of the representative period, in response to the registration-completed information receiving system receiving the registration-completed information according to the registration request for requesting to register the start of the transmission service. Then, the transmission period updating system updates each of the transmission periods with the representative period included in the representative period information sent from the management server in response to the representative period information request.

Further, in the information-providing server, the transmission period data sending system sends the transmission period data representing the transmission period of the specified contents, in response to the transmission service registering system completing the registration of the start of the transmission service.

Further, in the management server, the transmission period determining system determines the representative period based upon the two or more transmission period data sent from the information-providing server, and the transmission period informing system sends the representative period information representing the representative period determined by the transmission period determining system, in response to the representative period information request sent from the information-processing device.

Namely, according to the communication system thus configured, as the management server determines the representative period, the information-processing device can update the transmission period by receiving the representative period from the management server Optionally, the minimum one of the transmission periods for which the start of the transmission service has been registered may be determined as the representative period.

Thereby, the information-processing device can receive each of all the specified contents for which the starts of the transmission services are registered immediately after each of all the specified contents have existed in the information-providing server.

According to another aspect of the present invention, there is provided an information-processing device connected with an information-providing server configured to send contents via a network to receive the contents, the information-processing device being connected with a management server configured to check whether the contents to be received exist in the information-providing server via the network, the information-processing device comprising: a registration request sending system configured to send a registration request for requesting to register one of a start and a stop of a transmission service of sending specified contents to the information-providing server; a registration-completed information receiving system configured to receive registration-completed information for informing that the registration of one of the start and stop of the transmission service has been completed that is to be sent from the information-providing server in response to the registration request; an existence checking request sending system configured to send an existence checking request for checking whether the specified contents exist in the information-providing server in response to the registration-completed information receiving system receiving the registration-completed information to the management server at intervals of a transmission period predetermined for each of the specified contents; an existence judging system configured to receive a check result to be sent from the management server in response to the existence checking request and to judge whether the received check result represents that the specified contents exist in the information-providing server; a transmission requesting system configured to send a transmission request for requesting to send the specified contents to the information-providing server, in response to the existence judging system judging that the specified contents exist; a specified contents receiving system configured to receive the specified contents to be sent from the information-providing server in response to the transmission request; and a transmission period updating system configured to update each of the transmission periods with a representative period determined based upon the transmission period of each of the specified contents to be sent by two or more transmission services, in response to starting to employ the two or more transmission services with the registration-completed information receiving system receiving the registration-completed information.

In other words, the above information-processing device corresponds to any of the information-processing devices included in the aforementioned communication systems, and the above information-processing device can constitute any of the communication systems.

According to a further aspect of the present invention, there is provided a computer usable medium having instructions stored thereon that are configured readable by a computer, the computer being connected with an information-providing server configured to send contents via a network to receive the contents, the computer being connected with a management server configured to check whether the contents to be received exist in the information-providing server via the network, the instructions causing the computer to serve as: a registration request sending system configured to send a registration request for requesting to register one of a start and a stop of a transmission service of sending specified contents to the information-providing server; a registration-completed information receiving system configured to receive registration-completed information for informing that the registration of one of the start and stop of the transmission service has been completed that is to be sent from the information-providing server in response to the registration request; an existence checking request sending system configured to send an existence checking request for checking whether the specified contents exist in the information-providing server in response to the registration-completed information receiving system receiving the registration-completed information to the management server at intervals of a transmission period predetermined for each of the specified contents; an existence judging system configured to receive a check result to be sent from the management server in response to the existence checking request and to judge whether the received check result represents that the specified contents exist in the information-providing server; a transmission requesting system configured to send a transmission request for requesting to send the specified contents to the information-providing server, in response to the existence judging system judging that the specified contents exist; a specified contents receiving system configured to receive the specified contents to be sent from the information-providing server in response to the transmission request; and a transmission period updating system configured to update each of the transmission periods with a representative period determined based upon the transmission period of each of the specified contents to be sent by two or more transmission services, in response to starting to employ the two or more transmission services with the registration-completed information receiving system receiving the registration-completed information.

Namely, the above computer program product is for causing the computer to serve as each of the systems included in any of the aforementioned communication systems, and the above computer program product can bring each of the systems included in any of the aforementioned communication systems into practice with the computer executing the instructions included in the computer program product.

In the meantime, the instructions included in the computer program product may be stored in a ROM or a backup RAM incorporated in the information-processing device, and may be used loaded from the ROM or the backup RAM into the computer. In addition, the instructions may be used loaded into the computer via the network.

Further, the instructions may be used stored in a computer-readable medium such as a flexible disk (FD), Magneto-Optical disk (MO), DVD, CD-ROM, Blu-Ray disk, HD-DVD, hard disk, and memory card.

Illustrative Aspects

Hereinafter, illustrative aspects according to the present invention will be explained with reference to the accompanying drawings.

First Illustrative Aspect

Figure 1:
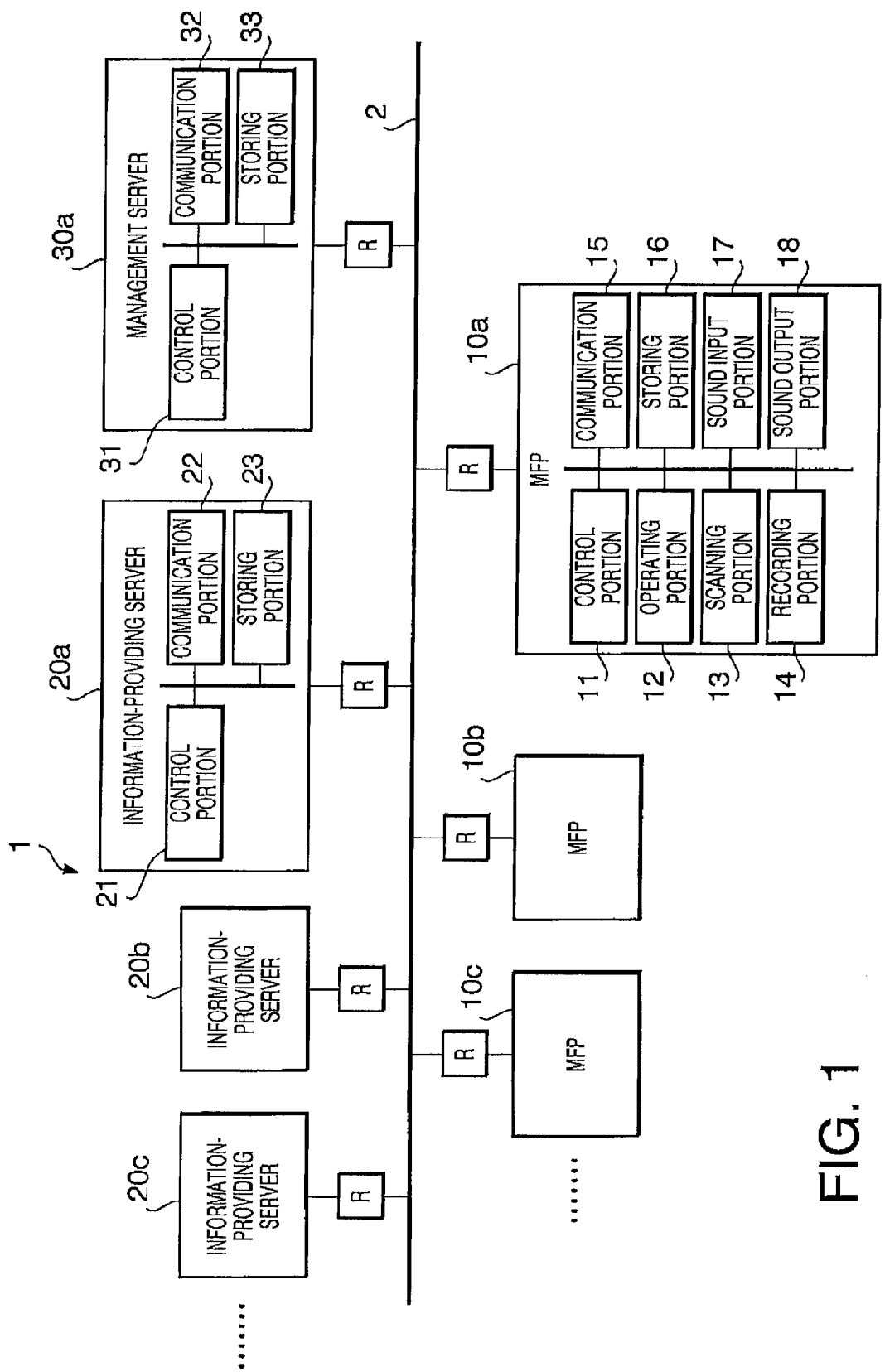
FIG. 1 is a block diagram showing a configuration of a communication system in a first illustrative aspect according to the present invention.

FIG. 1 is a block diagram showing a configuration of a communication system in a first illustrative aspect. As shown in FIG. 1, a communication system 1 is configured with a plurality of MFPs (Multi Function Peripherals) 10a, 10b, 10c, . . . (hereinafter, referred to as "MFPs 10") configured to receive contents, a plurality of information-providing servers 20a, 20b, 20c, . . . (hereinafter, referred to as "information-providing servers 20") configured to send the contents, and a management server 30 configured to check whether the contents to be received by each of the MFPs 10 exist in the information-providing server 20 being interconnected via an internet 2. It is noted that each of the MFPs 10, information-providing servers 20, and management server 30 is connected to the internet 2 via a widely known router R.

The MFP 10 is provided with a control portion 11 configured to take overall control of elements included in the MFP 10, an operating portion 12 for a user of the MFP 10 performing an input operation for the MFP 10, a scanning portion 13 configured to scan an image recorded on a sheet-like recording medium such as a paper to generate image data representing the image, a recording portion 14 configured to print the image represented by the image data on a sheet-like recording medium such as a paper, and a communication portion 15 configured to send and receive data via the internet 2.

In addition, the MFP 10 is provided with a storing portion 16 configured to store various kinds of parameters used for the control portion 11 controlling the MFP 10, and/or error codes generated in the MFP 10, a sound input portion 17 configured to convert a sound signal transmitted from a microphone (not shown) provided in the MFP 10 or a handset (not shown) included in the MFP 10 into sound data (PCM data), and a sound output portion 18 configured to convert the sound data (PCM data) into a sound signal and transmit the sound signal to a speaker (not shown) provided in the handset to be outputted therefrom.

It is noted that, among the aforementioned constituent elements, the control portion 11 includes a CPU, ROM, and RAM, and the CPU takes overall control of the elements included in the MEP 10 according to a program stored in the ROM.

The operating portion 12 is configured with a display device and various kinds of operating keys. The storing portion 16 is configured with a non-volatile memory to store and/or read data in response to a request from the control portion 11.

The information-providing server 20 is provided with a control portion 21 configured to take overall control of elements included in the information-providing server 20, a communication portion 22 configured to send and receive data via the internet 2, and a storing portion 23 configured to store data of various kinds of contents. There are stored in each of the information-providing servers 20 contents specific thereto (different from those stored in the other information-providing servers 20) such as extra news and cooking recipes.

It is noted that, among the aforementioned constituent elements, the control portion 21 is configured with a CPU, ROM, and RAM, and the CPU takes overall control of the elements included in the information-providing server 20 according to a program stored in the ROM.

The storing portion 23 is configured with a hard disk drive to store data therein and/or read out the stored data therefrom in response to a command from the control portion 21.

In addition, the management server 30 is provided with a control portion 31 configured to take overall control of elements included in the management server 30, a communication portion 32 configured to send and receive data via the internet 2, and a storing portion 33 configured to store the below-mentioned various kinds of databases.

It is noted that, among the aforementioned constituent elements, the control portion 31 is configured with a CPU, ROM, and RAM, and the CPU takes overall control of the elements included in the management server 30 according to a program stored in the ROM.

The storing portion is configured with a hard disk drive to store data therein and/or read out the stored data therefrom in response to a command from the control portion 31.

Hereinafter, among various kinds of processes to be executed by the control portions 11, 21, and 31 of the MFP 10, the information-providing server 20, and the management server 30, processes according to one or more aspects of the present invention will be described.

Figure 2:
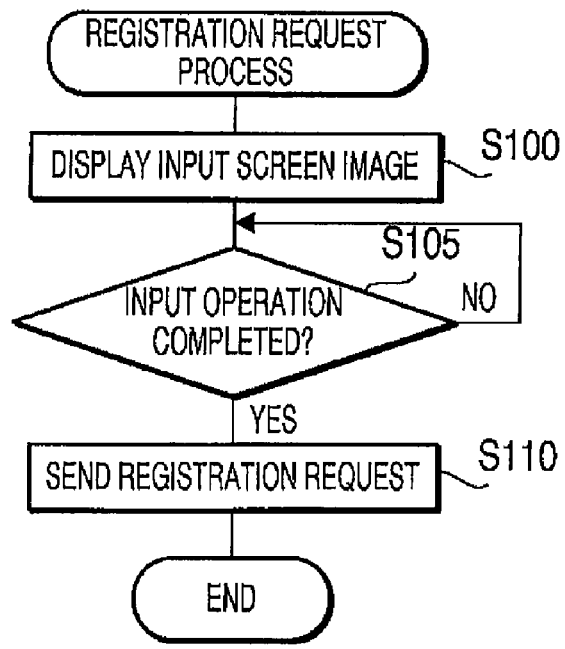
FIG. 2 is a flowchart showing a procedure of a registration request process to be executed by a control portion of an MFP in the first illustrative aspect according to the present invention.

Firstly, various kinds of processes to be executed by the control portion 11 of the MFP 10 will be explained. It is noted that the control portion 11 executes the following processes in parallel. FIG. 2 is a flowchart showing a procedure of a registration request process to be executed by the control portion 11 of the MFP 10. It is noted that the control portion 11 is configured to execute the process when an input operation for requesting to register a start or a stop of a transmission service of sending the contents is performed for the operating portion 12.

As shown in FIG. 2, in the process, firstly, there is displayed on the display device of the operating portion 12 an input screen image for inputting various kinds of registration items such as the start or stop of the transmission service and personal information of the user (S100). Then, the control portion 11 keeps waiting until the input operation for inputting the various kinds of registration items has been completed (S105).

Subsequently, after the input operation has been completed (S105: Yes), a registration request for requesting to register the various kinds of registration items is sent to the information-providing server 20 as a destination of the registration request (S110) to terminate the process. It is noted that the registration request includes a command for requesting to register the start or stop of the transmission service, the inputted various kinds of registration items, and a device ID for specifying the MFP 10.

Figure 3:
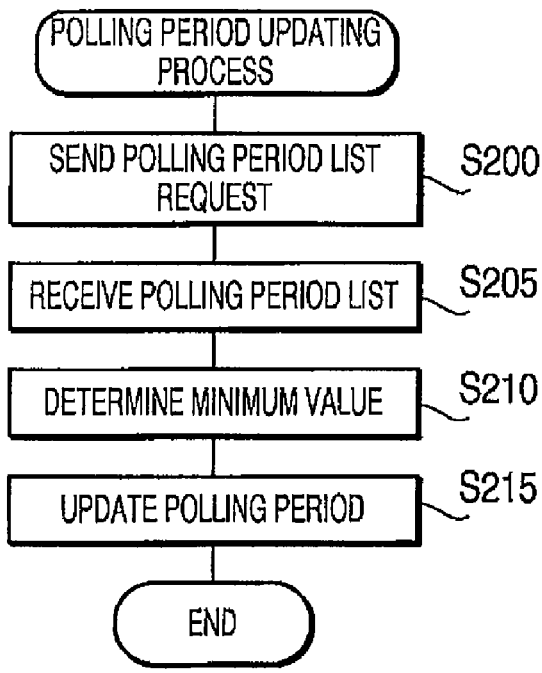
FIG. 3 is a flowchart showing a procedure of a polling period updating process to be executed by the control portion of the MFP in the first illustrative aspect according to the present invention.

FIG. 3 is a flowchart showing a procedure of a polling period updating process to be executed by the control portion 11. It is noted that the control portion 1I is configured to execute the process when receiving registration-completed information, which is sent from the information-providing server 20 in response to the registration request sent to the information-providing server 20 in the aforementioned step of S110, for informing that the registration of the start or stop of the transmission service has been completed.

As shown in FIG. 3, in the process, firstly, a polling period list request for requesting to send a polling period list as a list of polling period determined for each of the contents for which the start of the transmission service is registered is sent to the management server 30 (S200). It is noted that the polling period list request includes a command for requesting the polling period list, and the device ID of the MFP 10 (see FIG. 5A).

Then, the polling period list (see FIG. 5B) is received from the management server 30 (S205), and the minimum value is determined among the polling periods included in the polling period list (S210). Thereafter, the polling period set by the control portion 11 is updated with the determined minimum value (S215) to terminate the process.

Figure 4:
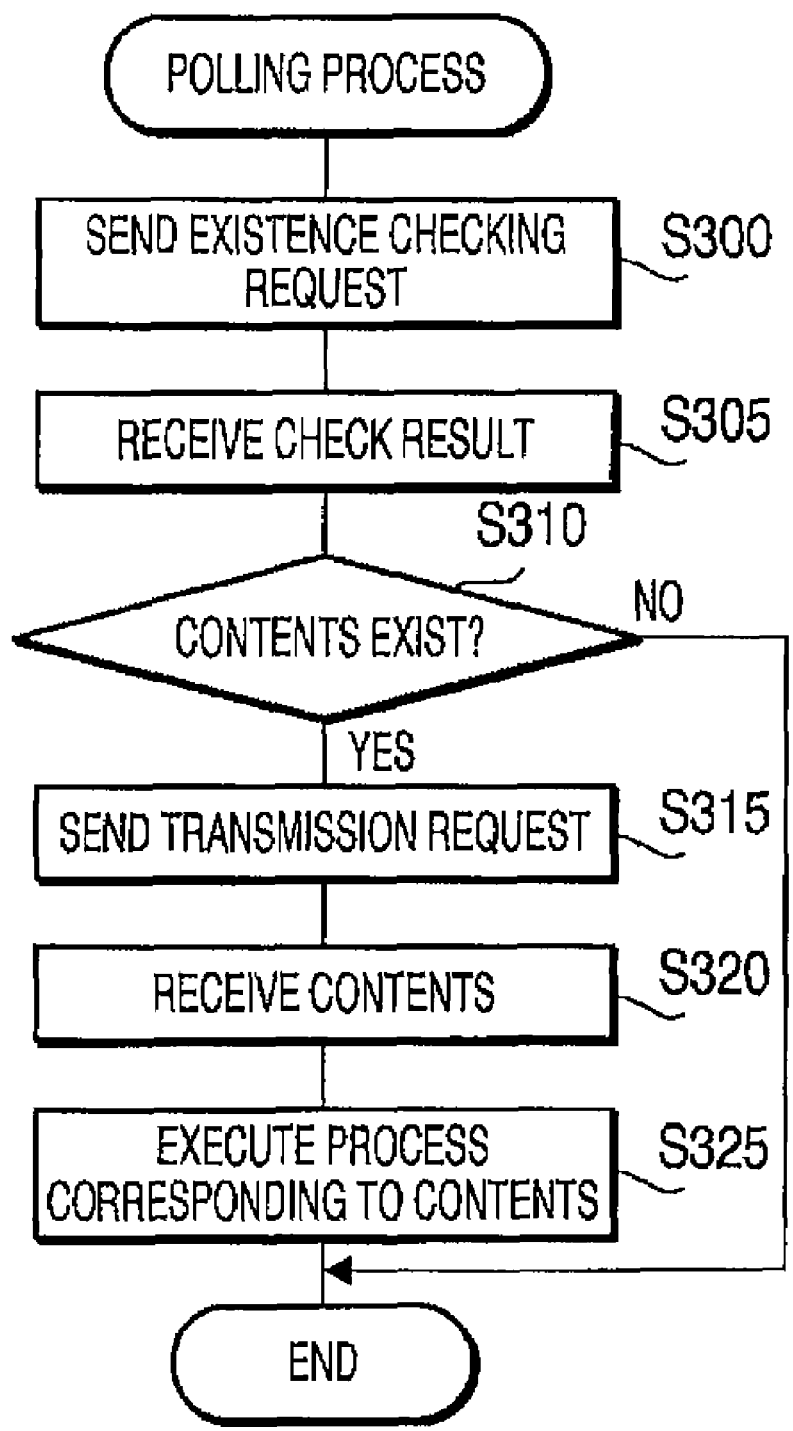
FIG. 4 is a flowchart showing a procedure of a polling process to be executed by the control portion of the MFP in the first illustrative aspect according to the present invention.

FIG. 4 is a flowchart showing a procedure of a polling process to be executed by the control portion 11. It is noted that the control portion 11 is configured to execute the process every time the polling period set by the control portion 11 has elapsed.

As shown in FIG. 4, in the process, firstly, an existence checking request for requesting the MFP 10 to check whether the contents for which the start of the transmission service is registered exist in the information-providing server 20 is sent to the management server 30 (S300). It is noted that the existence checking request includes a command for requesting to check the existence of the contents, and the device ID of the MFP 10 (see FIG. 5C).

Then, a check result representing existence or nonexistence of the contents is received from the management server 30 (S305), and thereafter, it is judged whether the received check result represents that the contents exist (S310). It is noted that the check result includes only information that the contents do not exist when the contents do not exist (see FIG. 5D), while the check result includes information that the contents exist, and an URL of the contents when the contents exist (see FIG. 5E).

When the check result represents that the contents do not exist (S310: No), the process is right terminated. Meanwhile, when the check result represents that the contents exist (S310: Yes), a transmission request for requesting to send the contents based upon the URL included in the check result is sent to a corresponding information-providing server 20 (S315). It is noted that the transmission request includes a command for requesting to send the contents, and the device ID of the MFP 10.

Then, after the contents sent from the information-providing server 20 in response to the transmission request are received, (S320), and a process corresponding to the received contents is executed (S325), the process is terminated.

It is noted that, for example, when the contents includes extra news and cooking recipes, a process for making the recording portion 14 print the contents corresponds to the process corresponding to the received contents.

Next, various kinds of processes to be executed by the control portion 21 of the information-providing server 20 will be explained. It is noted that the control portion 21 executes the following processes in parallel.

FIG. 6 is a flowchart showing a procedure of a registration process to be executed by the control portion 21. It is noted that the control portion 21 executes the process when receiving the aforementioned registration request from the MFP 10.

As shown in FIG. 6, in the process, firstly, a registration is executed based upon a command included in the aforementioned registration request (S400). At this time, when the command is for requesting to register the start of the transmission service, the control portion 21 registers the various kinds of registration items in the storing portion 23 associated with the device ID. Meanwhile, when the command is for requesting to register the stop of the transmission service, the control portion 21 deletes the device ID and the various kinds of registration items associated with the device ID from the storing portion 23.

Then, the registration request received from the MFP 10 is sent to the management server 30 (S405). It is noted that, when the registration request is for requesting to register the start of the transmission service, the registration request includes a command for requesting to register the start of the transmission service, and the device ID (see FIG. 8B).

Then, after reception-completed information that represents that the management server 30 has received the registration request is received from the management server 30 (S410), the aforementioned registration-completed information is sent to the MFP 10 (S415) to terminate the process.

FIG. 7 is a flowchart showing a procedure of a contents sending process. It is noted that the control portion 21 executes the process when new contents are stored in the storing portion 23 of the information-providing server 20.

As shown in FIG. 7, in the process, firstly, a contents registration request for requesting to register information on new contents existing in the information-providing server 20 is sent to the information-providing server 20 (S500). It is noted that the contents registration request includes a command for requesting to register the information on new contents existing, the device ID of the MFP 10 as a destination of the contents, and a URL of the contents (service URL) (see FIG. 8C).

Then, after reception-completed information, which represents that the management server 30 has received the contents registration request, is received (S505), the aforementioned transmission request for requesting to send the contents is received from the MFP 10 (S510), and the contents is read out from the storing portion 23. Thereafter, the read contents is sent to the MFP 10 specified by the device ID included in the transmission request (S515), and the process is terminated. It is noted that the contents is sent only when the device ID included in the transmission request is registered in the storing portion 23 in the step of S515.

Next, various kinds of processes executed by the control portion 31 of the management server 30 will be explained. It is noted that the control portion 31 executes the following processes in parallel after the management server 30 has been booted.

FIG. 9 is a flowchart showing a procedure of a registration process to be executed by the control portion 31 of the management server 30. As shown in FIG. 9, in the process, firstly, the control portion 31 keeps waiting until the aforementioned registration request is received from the information-providing server 20 (S600), and thereafter, when the registration request is received (S600: Yes), a registration based upon the command included in the received registration request is executed (S605). It is noted that, at this time, when the command is the registration request for requesting to register the start of the transmission service, the control portion 31 registers a polling period included in the registration request in the storing portion 33 associated with the device ID included in the registration request. Namely, in the storing portion 33, there is stored a subscription database (subscription DB) in which the device ID and the polling period are registered associated with each other. On the other hand, when the command is the registration request for requesting to register the stop of the transmission service, the polling period for the contents for which the stop of the transmission service is to be registered is deleted from the polling periods registered in the subscription DB associated with the device ID.

Then, the aforementioned reception-completed information, which represents that the registration request has been received is sent to the information-providing server 20 (S610), and the process goes to the aforementioned step of S600.

FIG. 10 is a flowchart showing a procedure of a polling period list sending process to be executed by the control portion 31. As shown in FIG. 10, in the process, firstly, after the control portion 31 keeps waiting until the aforementioned polling period list request has been received from the MFP 10 (S700), and, when the polling period list is received (S700: Yes), all of the polling periods associated with the device ID included in the polling period list request are read out from the subscription DB (S705) to create the aforementioned polling period list (S710).

Subsequently, the created polling period list is sent to the MFP 10 (S715) to bring the process to the aforementioned step of S700 again.

FIG. 11 is a flowchart showing a procedure of a contents registration process to be executed by the control portion 31. As shown in FIG. 11, in the process, firstly, after the control portion 31 keeps waiting until the aforementioned contents registration request has been received from the information-providing server 20 (S800), when the contents registration request is received (S800: Yes), the URL of the contents included in the contents registration request is registered in the storing portion 33 associated with the device ID included in the contents registration request (S805). Namely, in the storing portion 33, there is stored a job database (job DB) in which the device ID and the URL of the contents are registered associated with each other.

Then, the aforementioned reception-completed information, which represents that the contents registration request has been received, is sent to the information-providing server 20 (S810), and thereafter, the process goes to the aforementioned step of S800 again.

FIG. 12 is a flowchart showing a procedure of a contents existence checking process to be executed by the control portion 31. As shown in FIG. 12, in the process, firstly, the control portion 31 keeps waiting until the aforementioned existence checking request has been received from the MFP 10 (S900). Thereafter, when the existence checking request is received (S900: Yes), it is judged whether the URL of the contents is registered in the job DB associated with the device ID included in the existence checking request (S905).

When the URL is not registered (S905: No), the aforementioned check result, which represents that the contents do not exist, is sent to the MFP 10 (S910), and the process goes to the aforementioned step of S900. Meanwhile, when the URL is registered (S905: Yes), the aforementioned check result, which includes information representing that the contents exist and the URL of the contents, is sent to the MFP 10 (S915), and the process goes to the aforementioned step of S900 again. It is noted that, in the step of S915, the URL included in the check result is deleted from the job DB.

With the above various kinds of processes being executed by the control portions 11, 21, and 31 of the MFP 10, the information-providing server 20, and the management server 30, a process as shown in FIG. 13 is executed in the communication system 1 in the first illustrative aspect. It is noted that FIG. 13 is an illustration schematically showing a procedure of the process in the whole of the communication system in the first illustrative aspect.

In other words, when the registration request of the start or the stop of the transmission service is issued by the user in the MFP 10, the MEP 10 sends the registration request to the information-providing server 20 (1). Then, when receiving the registration request, the information-providing server 20 executes the registration of the start or the stop of the transmission service, and sends the same registration request to the management server 30 (2). Subsequently, when receiving the registration request, the management server 30 executes the registration of the start or the stop of the transmission service in the subscription DB in response to the registration request.

Then, when the registration has been completed in the management server 30, the information-providing server 20 sends the registration-completed information to the MFP 10 (3). Thereafter, when receiving the registration-completed information, the MFP 10 sends the polling period list request to the management server 30 (4).

Subsequently, when receiving the polling period list request, the management server 30 reads out the polling periods, and sends the polling period list to the MFP 10 (5). When receiving the polling period list, the MFP 10 updates the polling period set therein with the minimum value among the poling periods included in the polling period list (6).

Thereafter, when new contents are stored in the information-providing server 20, the information-providing server 20 sends the contents registration request to the management server 30 (7). When receiving the contents registration request, the management server 30 registers the URL of the contents in the job DB.

On the other hand, when the polling period has elapsed in the MFP 10, the MFP 10 sends the existence checking request to the management server 30 (8). When receiving the existence checking request, the management server 30 checks whether the contents exists with reference to the job DB to send the check result to the MFP 10 (9).

Subsequently, the MFP 10 receives the check result. When the check result represents that the contents exist, the MFP 10 sends the transmission request for requesting to send the contents to the information-providing server 20. When receiving the transmission request, the information-providing server 20 sends the contents to the MFP 10.

In other words, in the communication system 1 in the first illustrative aspect, the MFP 10 updates the polling period set therein with the minimum value among the polling periods that are determined for respective all of the contents for which the starts of the transmission services are registered. Accordingly, even in the case of using two or more transmission services, the existence checking request is not sent to the management server 30 separately for each of the transmission services.

For this reason, according to the communication system 1 in the first illustrative aspect, a number of transmission services for sending the contents can be used without causing too much heavy traffic on the network.

In addition, according to the communication system 1 in the first illustrative aspect, the MFP 1 receives the polling periods sent from the information-providing server 20 via the management server 30, and updates the polling period set therein with a polling period determined based upon the received polling periods.

Further, in the communication system 1 in the first illustrative aspect, the MFP 10 updates the polling period set therein with the minimum value among the polling periods determined for respective all of the contents for which the starts of the transmission services are registered. Therefore, the contents can be received immediately after the contents have existed in the information-providing server 20.

Second Illustrative Aspect

Next, a second illustrative aspect will be described. It is noted that, according to the second illustrative aspect each of the processes to be executed by the control portion 11 of the MFP 10 and the control portion 31 of the management server 30 in the first illustrative aspect is only partially changed, and the second illustrative aspect is the same as the first illustrative aspect for the rest. Accordingly, hereinafter, matters in common with the first illustrative aspect will be omitted, and only those different therefrom will be explained.

FIG. 14 is a flowchart showing a procedure of a polling period updating process to be executed by the control portion 11 of the MFP 10 in the second illustrative aspect as substitute for the polling period updating process in the first illustrative aspect. It is noted that the control portion 11 executes the process when receiving the registration-completed information from the information-providing server 20 in the same manner as the first illustrative aspect.

As shown in FIG. 14, in the process, firstly, a polling period request for requesting to inform of the polling period is sent to the management server 30 (S1000). It is noted that the polling period request includes a command for requesting to inform of the polling period, and the device ID.

Then, the poling period is received from the management server 30 (S1005), and a polling period set in the control portion 11 is updated with the received polling period (S1010) to terminate the process.

Next, FIG. 15 is a flowchart showing a procedure of a polling period sending process to be executed by the control portion 31 of the management server 30 in the second illustrative aspect as substitute of the polling period list sending process in the first illustrative aspect.

As shown in FIG. 15, in the process, firstly, the control portion 31 keeps waiting until the aforementioned polling period request has been received from the MFP 10 (S1100). Thereafter, when receiving the polling period request from the MFP 10 (S1100: Yes), all of the polling periods associated with the device ID included in the polling period request are read out from the subscription DB (S1105), and the minimum value is determined among the read polling periods (S1110).

Then, the minimum value is sent as the polling period to the MFP 10 (S1115) to bring the process to the aforementioned step of S1100. Namely, in the first illustrative aspect, the polling period of the MFP 10 is determined by the MFP 10, while, according to the communication system 1 in the second illustrative aspect, the polling period of the MFP 10 is determined by the management server 30, and the MFP 10 can update the polling period thereof only by receiving the polling period from the management server 30.

Hereinabove, the illustrative aspects according to the present invention have been explained. However, the present invention is not limited to the aforementioned illustrative aspects, and it is needless to say that various kinds of modifications may be possible as far as they are within the technical scope of the present invention.

In any of the aforementioned illustrative aspects, the polling period of the MFP 10 is updated with the minimum value determined among the polling periods registered in the subscription DB. However, the polling period of the MEP 10 may be updated with a polling value determined with another method, for example, with a polling value determined as an average value calculated from the polling periods registered in the subscription DB.

Further, in any of the aforementioned illustrative aspects, the communication system 1 is separately provided with the information-providing server 20 and the management server 30. However, as substitute of them, the communication system 1 may be provided with one server having both of the functions of them.

What is claimed is:

1. A communication system, comprising:
   an information-processing device configured to receive contents;
   an information-providing server configured to send the contents to the information-processing device; and
   a management server configured to check whether the contents to be received by the information-processing device exist in the information-providing server, wherein the information-processing device, the information-providing server, and the management server are interconnected via a network, and
   wherein the information-processing device comprises:
      a registration request sending system configured to send a registration request for registering one of a start and a stop of a transmission service to the information-providing server, wherein the transmission service is for sending specified contents from the information-providing server to the information-processing device;
      a registration-completed information receiving system configured to receive registration-completed information from the information-providing server, wherein the registration-completed information is for informing that the registration of one of the start and the stop of the transmission service has been completed in response to the registration request;
      an existence checking request sending system configured to send an existence checking request to the management server at intervals of a transmission period predetermined for each of the specified contents, wherein the existence checking request is for checking whether each of the specified contents exist in the information-providing server;
      an existence judging system configured to receive a check result from the management server in response to the existence checking request and to judge whether the received check result indicates that the specified contents exist in the information-providing server;
      a transmission requesting system configured to send a transmission request to the information-providing server for requesting a transmission of the specified contents from the information-providing server to the information-processing device when the existence judging system indicates that the specified contents exist;
      a specified contents receiving system configured to receive the specified contents from the information-providing server in response to the transmission request; and
      a transmission period updating system configured to update each of the transmission periods with a representative period determined based on the transmission period of each of the specified contents of two or more transmission services,
   wherein the information-providing server comprises:
      a transmission service registering system configured to receive the registration request from the information-processing device for registering one of the start and the stop of the transmission service;
      a registration-completed information sending system configured to send the registration-completed information to the information-processing device when the transmission service registering system completes registering one of the start and the stop of the transmission service;
      an existence information sending system configured to send an existence information to the management server for indicating that the specified contents of the transmission service exist in the information-providing server when the specified contents exist in the information-providing server;

an transmission request receiving system configured to receive the transmission request from the information-processing device; and a specified contents sending system configured to send the specified contents to the information-processing device, in response to the transmission request receiving system receiving the transmission request, and wherein the management server comprises:

an existence information receiving system configured to receive the existence information from the information-providing server;

an existence checking request receiving system configured to receive the existence checking request from the information-processing device; and a check result sending system configured to determine whether the existence information receiving system has received the existence information and to send the determination result to the information-processing device as the check result when the existence checking request receiving system receives the existence checking request.

2. The communication system according to claim 1, wherein the information-processing device comprises a transmission period data information request sending system configured to send a transmission period information request to the management server for requesting a transmission period information which comprises the transmission period of each of the specified contents of the transmission service when the registration-completed information receiving system receives the registration-completed information and a transmission period information receiving system configured to receive the transmission period information from the management server, wherein the transmission period updating system is configured to update each of the transmission periods with the representative period that is determined based on the two or more transmission periods included in the transmission period information, and wherein the information-providing server comprises a transmission period data sending system configured to send transmission period data representing the transmission period of the specified contents when the transmission service registering system completes the registration of the start of the transmission service, and wherein the management server comprises:

a transmission period data receiving system configured to receive the transmission period data from the information-providing server; and a transmission period information sending system configured to send the transmission period data as the transmission period information to the information-processing device.

3. The communication system according to claim 1, wherein the information-processing device comprises a transmission period information requesting system configured to send a representative period information request to the management server for requesting the representative period when the registration-completed information receiving system receives the registration-completed information, wherein the transmission period updating system is configured to update each of the transmission periods with the representative period included in the representative period information, wherein the information-providing server comprises a transmission period data sending system configured to send transmission period data representing the transmission period of the specified contents to the management server when the transmission service registering system completes the registration of the start of the transmission service, wherein the management server comprises:

a transmission period determining system configured to determine the representative period based on the two or more transmission period data sent from the information-providing server; and a transmission period informing system configured to send the representative period information to the information-processing device when the management server receives the representative period information request from the information-processing device.

4. The communication system according to claim 1, wherein the minimum one of the transmission periods is the representative period.

5. An information-processing device connected to an information-providing server configured to send contents via a network to the information-processing device, the information-processing device is connected to a management server configured to check whether the contents exist in the information-providing server, the information-processing device comprising:

a registration request sending system configured to send a registration request for registering one of a start and a stop of a transmission service to the information-providing server, wherein the transmission service is for sending specified contents from the information-providing server to the information-processing device;

a registration-completed information receiving system configured to receive registration-completed information from the information-providing server, wherein the registration-completed information is for informing that the registration of one of the start and the stop of the transmission service has been completed in response to the registration request;

an existence checking request sending system configured to send an existence checking request to the management server at intervals of a transmission period predetermined for each of the specified contents, wherein the existence checking request is for checking whether each of the specified contents exist in the information-providing server;

an existence judging system configured to receive a check result from the management server and to judge whether the received check result indicates that the specified contents exist in the information-providing server;

a transmission requesting system configured to send a transmission request to the information-providing server for requesting a transmission of the specified contents from the information-providing server to the information-processing device when the existence judging system indicates that the specified contents exist;

a specified contents receiving system configured to receive the specified contents from the information-providing server; and A transmission period updating system configured to update each of the transmission periods with a representative period determined based on the transmission period of each of the specified contents of two or more transmission services.

6. The information-processing device according to claim 5, further comprising a transmission period data information request sending system configured to send a transmission period information request to the management server for requesting a transmission period information which comprises the transmission period of each of the specified contents of the transmission service when the registration-completed information receiving system receives the registration-completed information; and a transmission period information receiving system configured to receive the transmission period information from the management server, wherein the transmission period updating system is configured to update each of the transmission periods with the representative period that is determined based on the two or more transmission periods included in the transmission period information.

7. The information-processing device according to claim 5, further comprising a transmission period information requesting system configured to send a representative period information request to the management server for requesting the representative period when the registration-completed information receiving system receives the registration-completed information, wherein the transmission period updating system is configured to update each of the transmission periods with the representative period included in the representative period information.

8. The information-processing device according to claim 5, wherein the minimum one of the transmission periods is the representative period.

9. A computer usable medium having instructions stored thereon that are readable by a computer, the computer being connected with an information-providing server configured to send contents via a network to the computer, the computer being connected with a management server configured to check whether the contents exist in the information-providing server, the instructions causing the computer to execute the steps of:

sending a registration request for registering one of a start and a stop of a transmission service to the information-providing server, wherein the transmission service is for sending specified contents from the information-providing server to the information-processing device;

receiving registration-completed information from the information-providing server, wherein the registration-completed information is for informing that the registration of one of the start and the stop of the transmission service has been completed in response to the registration request;

sending an existence checking request to the management server at intervals of a transmission period predetermined for each of the specified contents, wherein the existence checking request is for checking whether each of the specified contents exist in the information-providing server;

receiving a check result from the management server and to judge whether the received check result indicates that the specified contents exist in the information-providing server;

sending a transmission request to the information-providing server for requesting a transmission of the specified contents from the information-providing server to the information-processing device when the existence judging system indicates that the specified contents exist;

receiving the specified contents from the information-providing server; and updating each of the transmission periods with a representative period determined based on the transmission period of each of the specified contents of two or more transmission services.

* * * * *